May 2, 1944.  H. B. CUMMINGS  2,347,991
LAWN MOWER APPLIANCE
Filed Aug. 28, 1941
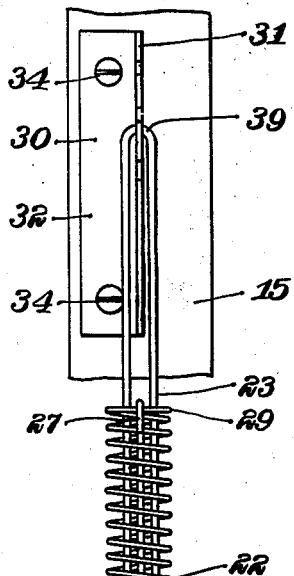
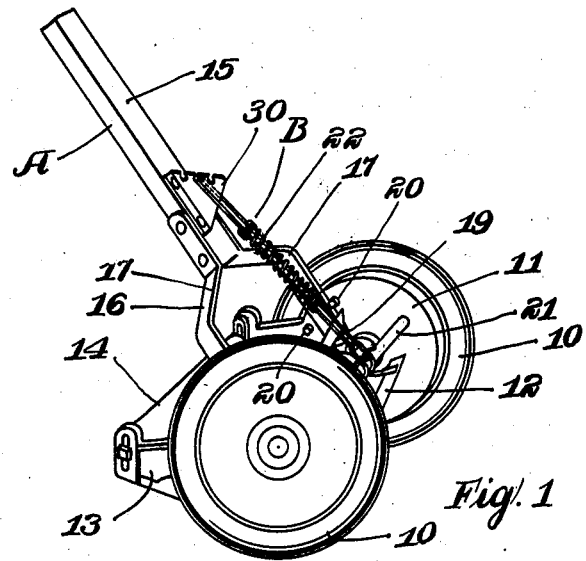
Fig. 1
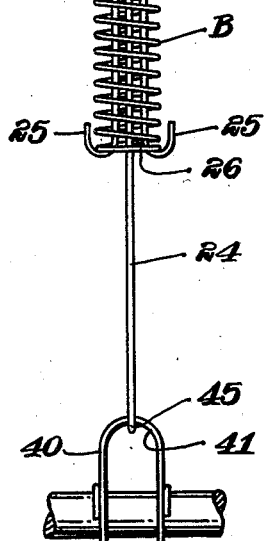
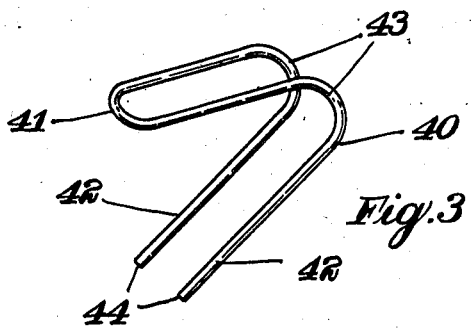
Fig. 3
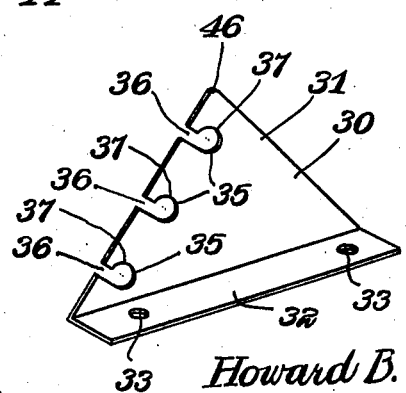
Fig. 4
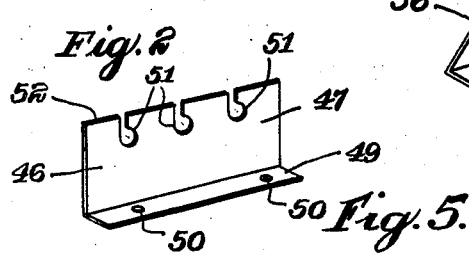
Fig. 2
Fig. 5
*Howard B. Cummings*
INVENTOR
BY *Robert M. Dunning*
ATTORNEY Patented May 2, 1944

2,347,991

UNITED STATES PATENT OFFICE 2,347,991

LAWN MOWER APPLIANCE

Howard B. Cummings, St. Paul Park, Minn.

Application August 28, 1941, Serial No. 408,574

2 Claims. (Cl. 56—249)

My invention relates to an improvement in lawn mower appliances, wherein it is desired to provide a device capable of improving the operation of a lawn mower.

With lawn mowers of the usual type, the handle by which the lawn mower is forced along the ground is pivotally attached to the frame of the mower. This pivotal attachment allows the body of the mower to pivot about the traction wheels when the mower is forced against tall grass, or the like. As a result, as the mower is forced into tall grass, the rear end of the mower raises out of contact with the ground, thus raising the cutting reel and the cutting blade associated therewith and causing the mower to raise to such an extent that the grass will not be properly cut. In order to avoid this difficulty, spring means have been provided connecting the handle of the mower with the frame of the same, so that the tendency of the mower frame to pivot about the traction wheels, upon an attempt to cut long grass, will lengthen or stretch the spring. Such devices have proven successful to some extent and have been used on certain types of mowers. The present device is an improvement on these previous types of devices which have been used for a similar purpose.

It is the object of the present invention to provide a compression spring which is connected between a bracket on the handle of the mower and a transversely extending cross member on the mower frame. This compression spring is so connected as to be compressed as the body of the mower pivots about the traction wheels, thereby resisting this undesirable tendency.

A feature of the present invention lies in the fact that the bracket on the handle of the mower is in the transverse center of the handle of the mower, thereby centering the pressure upon the handle. This is important, as certain other constructions have been provided in which the handle bracket is secured to one side of the mower handle and the pull is not centrally distributed upon the handle.

A further feature of my invention lies in the provision of a hook-shaped anchoring member on the cross bar connecting opposite ends of the mower frame. This hook-shaped connector is easily attached to the cross bar and is slidable longitudinally thereof, and at the same time the part of the bracket engaged remains in alignment with the compression spring so that the line of force is substantially straight from the bracket on the mower handle to the transverse bar on the mower frame.

A further feature of the present invention lies in the provision of a bracket which includes a series of adjustment notches which permit the variation of the effective length of the spring and which also are at varying distances from the handle of the mower. This series of adjustment notches changes the leverage with which the spring engages the handle and also changes the effective length of the spring. When the spring is engaged in the outermost notch, the leverage exerted by the spring tending to pivot the handle upwardly is increased, while the effective length of the spring is decreased. As the spring is engaged in successive notches from the outermost notch to the innermost notch of the series, the leverage which the spring exerts against the handle is decreased, while the effective length of the spring is increased. Thus the desired spring tension may be obtained and the proper leverage upon the handle may also be obtained.

A feature of my invention resides in the provision of a bracket which is of relatively thin material and a compression spring which is actuated by a loop of wire extending through the spring and straddling the bracket. Because of the fact that the pull upon the bracket is always centralized, the bracket may be of relatively light material, thus not adding any material amount of weight to the mower.

These and other objects and novel features of my invention will be more clearly and fully set forth in the following specification and claims.

In the drawing forming a part of my specification:

Figure 1 is a perspective view of a lawn mower with my compression spring device attached thereto.

Figure 2 is a plan view of the device in readiness for operation.

Figure 3 is a perspective view of the hook-shaped bracket used to connect the spring device to the cross member on the mower frame.

Figure 4 is a perspective view of the bracket attached to the handle of the mower.

Figure 5 is a perspective view of a modified form of bracket.

The lawn mower A may be of any desired or preferred type and includes a pair of spaced parallel wheels 10 supporting a mower frame 11, which contains suitable ratchet gears, and the like, to drive the rotatable cutting reel 12. The cutting reel 12 is equipped with a cooperable cutting knife on the blade, as is common practice, not illustrated in the drawing; and on the rear end 13 of the frame 11 is adjustably mounted a roll-down roller 14.

The handle 15 is provided with a bifurcated end 16 which is formed by a pair of strap iron arms 17, which are pivotally attached at 19 to the frame 11. The bifurcated end 16 of the handle 15 is pivotal with respect to the frame 11 and is allowed to pivot within certain definite limits with respect thereto. Knobs or bosses, such as 20, may limit the pivotal movement of the handle 15 with respect to the mower frame 11.

A compression spring device B is connected between the handle 15 and a transversely extending bar 21 connecting opposite ends of the frame 11. This spring device B includes a compression spring 22 and a pair of wire loops 23 and 24. The wire loop 23 extends through the spring 22 and the ends 25 of the loop 23 are bent to form hooks which engage the end convolution 26 of the spring 22. The loop 24 extends through the spring 22 and is provided with hook-shaped loop ends 27, which engage over the end convolution 29 of the spring 22. Obviously as the loops 23 and 24 are pulled apart the spring 22 is compressed.

A bracket 30 is provided with a substantially triangularly shaped body 31 designed to extend substantially normal to the surface of the handle 15. A flange 32 is secured to the body 31 at approximately right angles and forms an attaching plate for the bracket 30. Spaced apertures 33 are provided in the flange 32 to permit attaching bolts 34, or other suitable attaching means to extend therethrough to clamp the flange 32 flat against the upper surface of the handle 15 of the mower A.

The body 31 of the bracket 30 is provided with a series of spaced notches 35 therein. Each of these notches 35 is provided with a relatively narrow entrance 36 and an enlarged inner portion 37. The notches 35 are positioned along the upper edge of the bracket 30 when the bracket is attached to the handle 15 so that these notches are on the opposite side of the bracket from the edge closest to the frame 11. The notches 35 are designed to engage the closed end 39 of the loop 23. This closed end 39 may be positioned in any of the notches 35.

A hook-shaped connecting member 40 is provided to connect the spring device B with the transversely extending frame member 21. The connecting member 40 is in the form of a U-shaped wire bracket with a closed end 41 connecting a pair of substantially parallel arms 42. The arms 42 are similarly bent at 43 so that the free ends 44 of the arms 42 extend angularly with respect to the portions of these arms adjacent the closed end 41. The bend 43 permits the bracket 40 to engage about the cross member 21. The closed end 41 of the connecting member 40 is designed to engage the closed end 45 of the loop 24. The arms 42 may if desired be wrapped about the cross bar 21, as best illustrated in Figures 1 and 2.

Any tendency for the rear end of the frame 11, including the roller 14, to pivot upwardly as the mower engages tall grass, or the like, is resisted by the compression spring device B. As the frame 11 pivots in a clockwise direction, as illustrated in Figure 1, about the traction wheels 10, the transverse member 21 is pulled away from the bracket 30, thus decreasing the length of the spring 22. Thus the mower A will cut tall grass more readily and more successfully than could otherwise be the case.

It will be noted that the successive notches 35 are at successively greater distances from the handle 15, as these notches come into closer spaced relation with the transverse bar 21. In other words, when the loop 23 is engaged in the notch 35 most closely adjacent the apex 46 of the triangular body 30. The leverage exerted by the spring 22 upon the handle 15 is increased because of the increase in length of the loop end 39 from the handle 15. Simultaneously, however, the effective length of the spring 22 is decreased because this notch 35 is closest to the cross bar 21 in the normal position of the handle indicated in Figure 1.

When the loop 23 is engaged in the notch 35 most closely adjacent the flange 32, the leverage exerted by the spring 22 against the handle 15 is decreased as the eccentricity of the connection between the loop 23 and the handle 15 is decreased. Simultaneously, however, the compression of the spring 22 is increased as this notch is a greater distance from the transverse bar 21 of the frame 11.

In Figure 5 of the drawing, I disclose a modified form of bracket construction. In this construction the bracket 46 is provided with a body portion 47 designed to lie on a plane at substantially right angles to the plane of the handle surface, and a flange 49 secured to the body 47 provides an attaching base. Apertures 50 through the flange 49 permit the use of screws to hold the bracket in place at any desired point along the handle 15. Notches 51, similar to the notches 35, are formed along the upper edge 52 of the bracket to engage the closed end 39 of the loop 23.

In accordance with the patent statutes, I have described the principles of construction and operation of my mower attachment, and while I have endeavored to set forth the best embodiment thereof, I desire to have it understood that obvious changes may be made within the scope of the following claims without departing from the spirit of my invention.

I claim:

1. An appliance for a lawn mower including a frame, a cross member on the frame, and a handle pivotally secured to the frame; said appliance comprising a plate secured to said handle to lie on a plane substantially normal to the cross member, said plate being substantially triangular in shape and having on its edge a series of notches spaced from said handle varying amounts and spaced from said cross member varying amounts, a loop straddling said plate and engageable in any of said notches, and spring means connected to said loop and to said cross member.

2. An appliance for a lawn mower including a frame, a cross member on the frame and a handle pivotally secured to the frame; said appliance comprising a plate secured to said handle to lie on a plane substantially normal to the cross member, said plate having on its edge a series of notches spaced from said handle varying amounts and spaced from said cross member varying amounts, a loop straddling said plate and engageable in any of said notches, and spring means connected to said loop and to said cross member.

HOWARD B. CUMMINGS.